US 12,241,518 B2

(12) United States Patent
Barry et al.

(10) Patent No.: US 12,241,518 B2
(45) Date of Patent: Mar. 4, 2025

(54) AUTONOMOUS ROBOT FOR POWER LINE VIBRATION CONTROL AND INSPECTION (71) Applicant: VIRGINIA TECH INTELLECTUAL PROPERTIES, INC., Blacksburg, VA (US)

(72) Inventors: Oumar Barry, Blacksburg, VA (US); Jiamin Wang, Blacksburg, VA (US); Paul-Camille Kakou, Blacksburg, VA (US)

( * ) Notice: Subject to any disclaimer, the term of this patent is extended or adjusted under 35 U.S.C. 154(b) by 184 days.

(21) Appl. No.: 17/998,735

(22) PCT Filed: Jun. 4, 2021

(86) PCT No.: PCT/US2021/035875
§ 371 (c)(1),
(2) Date: Nov. 14, 2022

(87) PCT Pub. No.: WO2021/247982
PCT Pub. Date: Dec. 9, 2021

(65) Prior Publication Data
US 2023/0332660 A1    Oct. 19, 2023

Related U.S. Application Data (60) Provisional application No. 63/034,736, filed on Jun. 4, 2020.

(51) Int. Cl.
*H02G 1/02* (2006.01)
*F16F 7/10* (2006.01)
*H02G 7/14* (2006.01)

(52) U.S. Cl.
CPC .......... *F16F 7/1005* (2013.01); *H02G 1/02* (2013.01); *H02G 7/14* (2013.01)

(58) Field of Classification Search
None
See application file for complete search history.

(56) References Cited

U.S. PATENT DOCUMENTS

| 4,346,255 A | * | 8/1982 | Nigol | H02G 7/14 174/42 |
| 6,397,988 B1 | * | 6/2002 | Ptak | F16F 1/505 188/380 |

(Continued)

FOREIGN PATENT DOCUMENTS

| CN | 102255270 A | 11/2011 |
| CN | 107370106 A | 11/2017 |
| CN | 109066475 A | 12/2018 |

OTHER PUBLICATIONS

International Search Report and Written Opinion for PCT/US2021/035875 mailed Sep. 2, 2021.

*Primary Examiner* — Krystal Robinson
(74) *Attorney, Agent, or Firm* — Perilla Knox & Hildebrandt LLP; Jason M. Perilla (57) ABSTRACT

Various embodiments of a system and method for reducing vibrations in and inspecting a suspended cable are described. In one embodiment, a vibration control robot includes a frame roller cage configured to roll open and closed around a cable, a drive system comprising a motor system to maneuver the robot along the cable, and a vibration absorption system to admit and absorb mechanical vibrations from the cable. The vibration absorption system can include a messenger cable segment of a predetermined length, where the messenger cable segment is mechanically coupled with the frame to admit mechanical vibrations on the cable. The vibration absorption system can also include an absorbing counterweight tip mass, a sliding mass, and a permanent (Continued)

magnet of an electromagnetic transducer device, to convert the mechanical vibrations in the messenger cable into electrical energy.

20 Claims, 6 Drawing Sheets

(56) References Cited

U.S. PATENT DOCUMENTS

| | | |
|---|---|---|
| 2004/0065458 A1 | 4/2004 | Hansen |
| 2011/0024152 A1* | 2/2011 | Espindola ................ H02G 7/14 |
| | | 174/42 |
| 2011/0196535 A1 | 8/2011 | Phillips et al. |
| 2013/0061466 A1* | 3/2013 | Casenhiser .............. H02G 1/02 |
| | | 174/42 |
| 2018/0031611 A1 | 2/2018 | Lindsey et al. |
| 2018/0316172 A1* | 11/2018 | Barry ..................... H02G 7/053 |

* cited by examiner

FIG. 9
AUTONOMOUS ROBOT FOR POWER LINE VIBRATION CONTROL AND INSPECTION

CROSS-REFERENCE TO RELATED APPLICATIONS

This application is a 35 U.S.C. § 371 national stage patent application of Patent Cooperation Treaty application number PCT/US2021/034564, filed Jun. 4, 2021, and titled "AUTONOMOUS ROBOT FOR POWER LINE VIBRATION CONTROL AND INSPECTION," which claims the benefit of priority to U.S. Provisional Application Ser. No. 63/034,736, filed Jun. 4, 2020, titled "SELF-POWERED AUTONOMOUS ROBOT FOR POWER LINE VIBRATION CONTROL AND INSPECTION," the entire contents of both of which applications are hereby incorporated herein by reference.

FEDERALLY SPONSORED RESEARCH STATEMENT

This invention was made with government support under Grant No. 1944032 awarded by the National Science Foundation. The government has certain rights in the invention.

BACKGROUND

Tuned mass dampers stabilize mechanical systems against the motions caused by harmonic vibrations, which can increase in an additive fashion under resonance. Typically, a tuned damper reduces the vibration of a system to mitigate worst-case vibrations. Such dampers are typically tuned to either move a main vibration mode away from the excitation frequency, or to add damping to a resonance that is difficult or expensive to damp directly. Mass dampers are often implemented using a frictional or hydraulic component that turns mechanical kinetic energy into heat energy.

Cable dampers, such as Stockbridge dampers, are tuned mass dampers relied upon to suppress vibrations, from wind and other factors, on overhead power lines. A Stockbridge damper consists of two masses at the ends of a short length of cable or flexible rod, which is clamped at the middle to the main cable. A Stockbridge damper can be relied upon to dissipate the energy of oscillations cables to an acceptable level, to prevent damage and service outages.

SUMMARY

Various embodiments of a system and method for reducing vibrations in and inspecting a suspended cable are described. In one embodiment, a vibration control robot includes a frame roller cage configured to roll open and closed around a cable, a drive system comprising a motor system to maneuver the robot along the cable, and a vibration absorption system to admit and absorb mechanical vibrations from the cable. The vibration absorption system can include a messenger cable segment of a predetermined length, where the messenger cable segment is mechanically coupled with the frame to admit mechanical vibrations on the cable. The vibration absorption system can also include an absorbing counterweight tip mass, a sliding mass, and a permanent magnet of an electromagnetic transducer device, to convert the mechanical vibrations in the messenger cable into electrical energy.

In one example, a vibration control robot includes a frame comprising a frame roller cage configured to roll open and closed around a cable, a drive system comprising a motor system to maneuver the robot along the cable, and a vibration absorption system to admit and absorb mechanical vibrations from the cable. The vibration absorption system can include a messenger cable segment of a predetermined length. The messenger cable segment can be mechanically coupled to the frame of the robot, to admit mechanical vibrations from the cable onto the messenger cable segment. The vibration absorption system can also include an absorbing counterweight tip mass secured at one end of the messenger cable segment and a sliding mass.

In other aspects of the embodiments, the vibration absorption system can also include a permanent magnet of an electromagnetic transducer, where the permanent magnet is fixedly positioned at a location along the messenger cable segment. The vibration absorption system can also include a second sliding mass, where the sliding mass is positioned on one side of the permanent magnet along the messenger cable segment, and the second sliding mass is positioned on another side of the permanent magnet along the messenger cable segment.

In other aspects of the embodiments, the frame can include a first side arm comprising a cable binder at one end of the first side arm, and a second side arm comprising a harvesting eyelet at one end of the second side arm. The electromagnetic transducer can also include a transducer coil positioned around the harvesting eyelet, and the permanent magnet can be positioned at a location along the messenger cable segment within the harvesting eyelet.

The drive system of the robot can include at least one passive roller to rest upon the cable and support the robot on the cable, and pre-loading springs to push the motor system against the cable and clamp the cable between the motor system and the passive roller. The robot can also include a power system comprising at least one battery and power regulation module. The robot can also include a communications module for wireless command and control communications. The control system can be configured to reposition the robot along the cable, to increase vibration suppression and energy harvesting, based on control signals from one or more sensors of the robot. As one example, the control system can be configured to reposition the robot at an antinode of the cable.

In another embodiment, a method for a vibration control robot includes sensing movement of a cable by the robot, and positioning the robot along the cable to increase suppression of the movement and energy harvesting by the robot. In this case, the robot can include a frame, the frame comprising a frame roller cage configured to roll open and closed around the cable, a drive system comprising a motor system to maneuver the robot along the cable, and a vibration absorption system to admit and absorb mechanical vibrations from the cable. In other aspects, the method can also include repositioning the robot, over time, to an antinode of the cable.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The self-powered autonomous robot described herein is inspired by current power line inspection robots and fixed passive vibration absorbers (FPVAs), such as Stockbridge dampers. However, conventional inspection robots do not control WIV or harvest energy. They are also bulky, heavy, and energy-inefficient. Also, conventional Stockbridge dampers are narrowband, unable to adapt to changing wind characteristics, and cannot reposition themselves at equilibrium points (i.e., at the antinode of a vibrating loop) to best suppress vibration.

The embodiments described herein seek to overcome these challenges by integrating power line inspection robots and vibration absorbers. The embodiments are lightweight and compact, and are suitable for permanent mounting on power lines. Simultaneous vibration control and energy harvesting are achieved via a messenger cable, counterweight, sliding mass, and electromagnetic transducer. The sliding mass enables the robot to self-tune and, hence, provide broadband vibration control and energy harvesting. The harvested energy can be used to move the robot to antinodes for best vibration control and provide power for sensors for power line monitoring and inspection. The drive system of the embodiments includes roller mechanisms adjustable to a variety of cable diameters. Based on control algorithms, the robot can detect and adapt to changing wind characteristics and intelligently reposition itself to a cable antinode, for example, to achieve optimal vibration control at a minimal energy cost.

Various embodiments of a system and method for reducing vibrations in and inspecting a suspended cable are described. In one embodiment, a vibration control robot includes a frame roller cage configured to roll open and closed around a cable, a drive system comprising a motor system to maneuver the robot along the cable, and a vibration absorption system to admit and absorb mechanical vibrations from the cable. The vibration absorption system can include a messenger cable segment of a predetermined length, where the messenger cable segment is mechanically coupled with the frame to admit mechanical vibrations on the cable. The vibration absorption system can also include an absorbing counterweight tip mass, a sliding mass, and a permanent magnet of an electromagnetic transducer device, to convert the mechanical vibrations in the messenger cable into electrical energy. In other aspects, the suspended cable system includes at least one passive roller to rest upon the cable and support the suspended cable system on the cable, and pre-loading springs to push the drive system against the cable and clamp the cable between the drive system and the passive roller.

Among other components, the suspended cable system can also include a power system comprising at least one battery and power regulation module, a communications module for wireless command and control communications, and a control system configured to reposition the suspended cable system along the cable to increase vibration suppression and energy harvesting. The control system can reposition the suspended cable system at an antinode of the cable, for example, or other suitable position.

Figure 1:
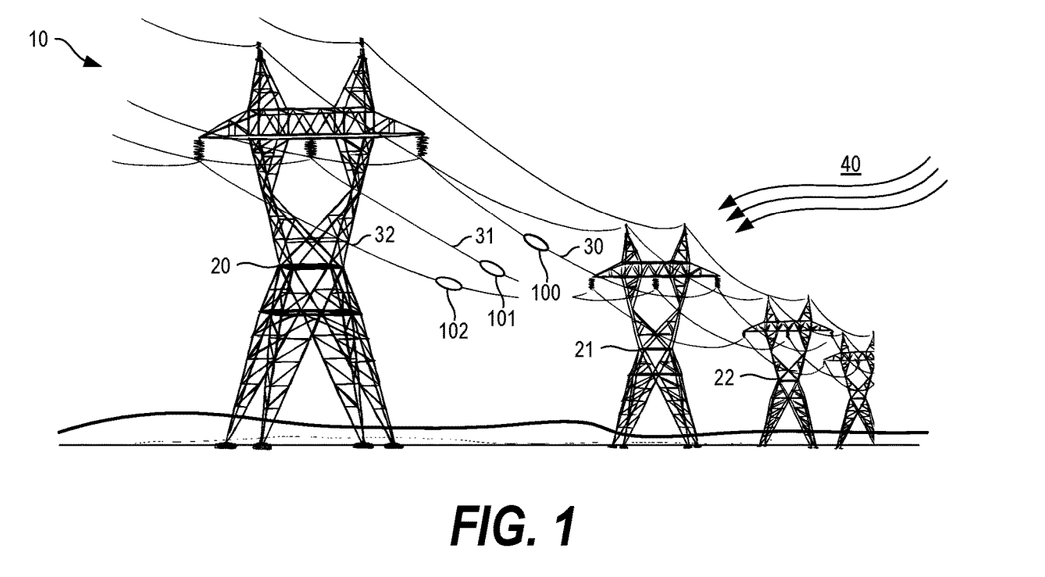
FIG. 1 illustrates an example of a power transmission system with vibration control robots according to various embodiments described herein.

Turning to the drawings, FIG. 1 illustrates an example of a power transmission system 10 with vibration control robots 100-102 according to various embodiments described herein. The power transmission system 10 includes transmission towers 20-22, among others, with high-voltage, overhead transmission cables or lines 30-32, among possibly others, that span between the transmission towers 20-22. The system 10 can be relied upon to transport bulk electric power from generating stations to electrical substations, after which sub-transmission lines, utility poles, and other infrastructure can be used to further support lower-voltage distribution of power from the substations to electric customers.

In the system 10, the transmission cables or lines 30-32 are relied upon to carry electrical energy across relatively large distances. As an example, each cable 30-32 can be embodied as an uninsulated electrical cable, such as an aluminum-conductor-steel-reinforced (ACSR) cable, an all-aluminum-alloy conductor (AAAC), a cable including copper, or another cable suitable for electrical energy transport.

The cables 30-32 are flexible and stretch to some extent (and at some length), with relatively uniform weight per unit length. Thus, the cables 30-32 can sag to some extent between the towers 20-22, and the shape of the cables 30-32 hanging between the towers 20-22 can approximate that of a catenary. The sag of the cables 30-32 can vary over time, depending on various factors, such as temperature, ice cover, wind, and other factors. Also, since the length of the cables 30-32 will increase with heat produced by current flowing through the cables 30-32, the sag of the cables 30-32 can also vary based on the load placed upon the system 10.

The cables 30-32 can be subject to aeroelastic flutter and related oscillations driven by wind 40 and other factors, and the oscillations can vary over time based on the extent of the wind 40, the sag of the cables 30-32, and other factors. In a linear system, the flutter point is the point at which a structure is undergoing simple harmonic motion. Without damping of the system, continued self-oscillation can ultimately result in failure. In that context, tuned mass dampers, harmonic absorbers, seismic dampers, and related dampers have been attached to the cables 30-32, for example, to change the characteristics of the physical oscillations on the cables 30-32. A Stockbridge damper is one example of a damper used on overhead transmission cables.

According to aspects of the embodiments, the system 10 includes a number of vibration control robots 100-102, respectively, fitted and secured to the cables 30-32. As described in further detail below, the robots 100-102 are lightweight, compact, and suitable for permanent mounting on the cables 30-32. The robots 100-102 are capable of simultaneous vibration control and energy harvesting using a vibration absorption system. In one example, the vibration absorption system of each robot 100-102 includes one or more messenger cables, counterweights, sliding masses, and electromagnetic transducers. The robots 100-102 can self-tune to vibrations on the cables 30-32 and, hence, provide broadband vibration control for the cables 30-32.

The robots 100-102 can also harvest energy based on the vibrations. The harvested energy can supply power for sensors, such as vibration sensors, cameras, and other sensors for power line monitoring and inspection. The harvested energy can also supply power for network communications between the robots 100-102 and, ultimately, to other network nodes and the Internet, for power line monitoring and inspection data gathering. The drive system of the robots 100-102 includes roller mechanisms adjustable to a variety of diameters of the cables 30-32. Based on control algorithms processed by controllers of the robots 100-102, the robots 100-102 can detect and adapt to changing vibrations and oscillations on the cables 30-32 and intelligently reposition to the antinodes of the cables 30-32, for example, to achieve the optimal vibration control at a minimal energy cost.

Figure 2:
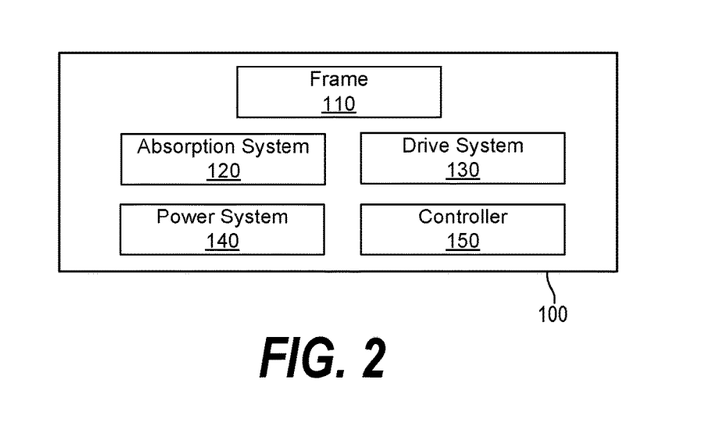
FIG. 2 illustrates an block diagram of certain components in a vibration control robot according to various embodiments described herein.
Figure 3:
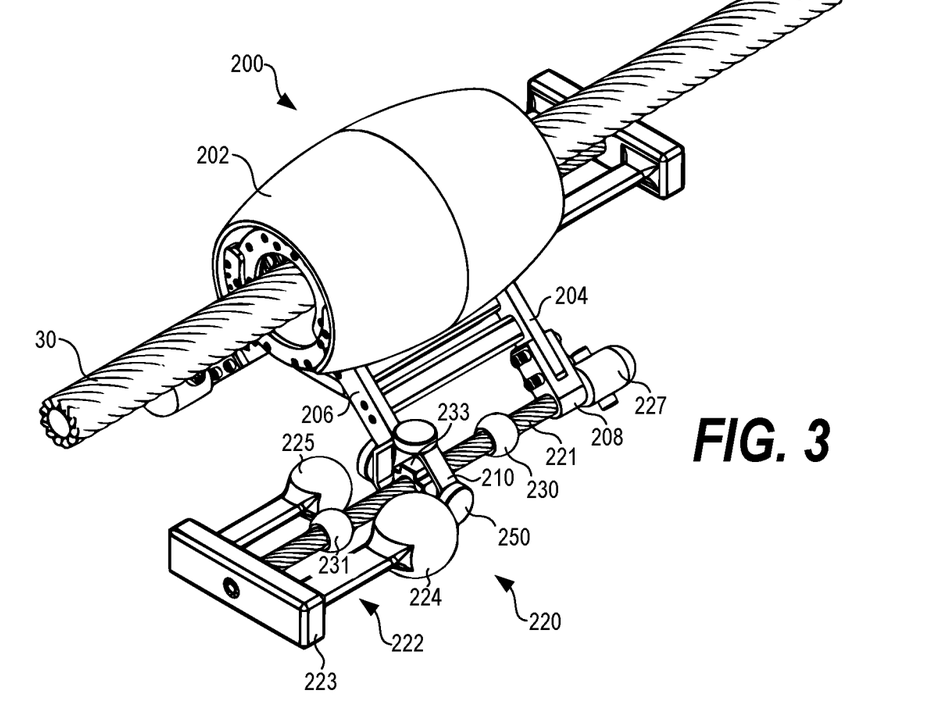
FIG. 3 is a perspective view of an example vibration control robot according to various embodiments described herein.

FIG. 2 illustrates a block diagram of certain components in a vibration control robot 100 according to various embodiments described herein. As shown, the robot 100 comprises a frame 110, an absorption system 120, a drive system 130, a power system 140, and a controller 150. The block diagram in FIG. 2 is a representative example of components that can be included in a vibration control robot according to the embodiments. FIG. 2 is not exhaustive in the illustration of all the parts or components of the robot 100, as the robot 100 can include other components that are not explicitly shown. Additionally, one or more of the components or features shown in FIG. 2 can be omitted in some cases. A more particular example of the robot 100 is shown in FIG. 3 and discussed below.

The frame 110 can be embodied as the physical frame and supporting structure for the robot 100. As described in the examples below, the frame 110 can be formed from metal, wood, other materials, and combinations thereof. The frame 110 can also include any number of fasteners or other means of securing the frame of the robot 100 together. The frame 110 can also include a cover, enclosure, or other shroud to enclose and protect the other systems of the robot 100. In one example, the frame 110 can include a frame platform, sidearms, a roller cage, and a cover. Examples of these components are described in greater detail below.

The absorption system 120 can be embodied as a mechanical system configured to admit and absorb mechanical vibrations from a cable, such as from the cable 30, shown in FIG. 1. The absorption system 120 can be mechanically fastened to the frame 110 of the robot 100. Vibrations on the cable 30 can pass through the frame 110 and be mechanically coupled to the absorption system 120. The absorption system 120 is designed to dampen and absorb the vibrations, to reduce flutter and related oscillations on the cable 30.

In one example, the absorption system 120 can include one or more messenger cable segments, each of a predetermined length. The messenger cable segments can be of different lengths in one example. The messenger cable segments can be formed from lengths of ACSR, AAAC, or related cable. The messenger cable segments can be the same diameter as the cable 30, for example, or can be a different diameter as compared to the cable 30. The lengths of the messenger cable segments can vary among the embodiments, as described in further detail below.

The messenger cable segments can be mechanically coupled to the frame 110 of the robot 100, to admit mechanical vibrations from the cable 30 onto the messenger cable segments. More particularly, the messenger cable segments can be mechanically coupled at ends of a sidearm or sidearms of the frame 110, as described in further detail below with reference to FIG. 2, although other connections and configurations are within the scope of the embodiments.

The absorption system 120 can also include one or more absorbing counterweight tip masses. Each counterweight tip mass can be secured at one end of a respective messenger cable segment. The absorption system 120 can also include one or more sliding masses, where the sliding masses are positioned around and configured to slide along the messenger cable segments. The absorbing counterweight tip masses and the sliding masses, along with the flexible nature of the messenger cable segments, dampen, and absorb mechanical vibrations that are admitted from the frame 110 of the robot 100.

The drive system 130 can include one or more passive rollers and a motor system, among other components. The passive rollers can be mechanically fastened to the frame 110 of the robot 100. When the robot 100 is secured to the cable 30, the passive rollers can rest upon the cable 30, supporting the robot 100 on and over the cable 30. The drive system 130 can also include pre-loading springs that push the motor system, which includes drive rollers, against the cable 30 from below. As described in further detail below, the drive system 130 clamps the cable 30 between the drive rollers and the passive rollers, securing the robot 100 to the cable 30. In this configuration, the driver rollers can also drive (i.e., push or pull) the robot 100 along a length of the cable 30, permitting the robot 100 to move and reposition itself along the cable 30 as needed to dampen vibrations.

The power system 140 can include one or more batteries, battery chargers, power converters or power regulation modules, and electromagnetic transducer systems, among other components. The robot 100 is configured to harness energy from the vibrations on the cable 30. Particularly, the electromagnetic transducer system generates energy for the robot 100, which is captured by the power system 140 and stored in a battery. The electromagnetic transducer system includes permanent magnets positioned at certain locations along the messenger cable segments of the absorption system 120. The electromagnetic transducer system also includes one or more transducer coils positioned around harvesting eyelets mounted to a sidearm of the frame 110. The messenger cable segments of the absorption system 120 extend through the eyelets, with the permanent magnets positioned within the eyelets. Thus, the vibrations dampened by the messenger cable segments move or vibrate the permanent magnets within the eyelets, inducing moving magnetic fields about the transducer coils. The transducer coils generate an electric potential based on the moving magnetic fields, and the power system 140 captures and stores the electric potential. In this way, the power system 140 is configured to harness energy from the vibrations on the cable 30.

The controller 150 can include embedded processing and memory circuitry, such as one or more processors, processing circuits, and memory circuits and devices. In part, the controller 150 can be embodied as an embedded controller capable of executing computer-readable instructions. The instructions, when executed by a processing circuit of the controller 150, can direct the controller 150 to control the overall operations of the robot 100. For example, the controller 150 can direct the drive system 130 to move the robot 100 in either direction along the cable 30, based on vibration control signals captured by vibration sensors, position sensors, or orientation sensors. The controller 150 can also direct the communication of data to and from the robot 100, monitor the operations of the power system 140, and control other operations of the robot 100 as described herein. Based on control algorithms executed by the controller 150, the robot 110 can detect and adapt to changing wind characteristics and intelligently reposition itself to an antinode of the cable 30, for example, to achieve optimal vibration control at a minimal energy cost. The controller 150 can detect an increased (or decreased) amplitude in oscillations on the cable 30, while slowly moving along the cable 30. The controller 150 can then direct the drive system 130 to move the robot 100 to an antinode of the cable 30, for example, to achieve the optimal vibration control at a minimal energy cost.

The controller 150 can also include one or more sensors, such as vibration, orientation, accelerometer, gyroscope, image, and other sensors. The sensors can also include contact, optical, temperature, proximity, pressure, humidity, acoustic, chemical and gas, smoke, and infrared sensors, among others. Each of the robots 100-102 can incorporate one or a combination of any of the above-identified sensors, among others, and gather data using the sensors. The data can be stored in memory of the controller 150 for further processing. The sensors can be positioned at any suitable location(s) on or about the frame 110 of the robot 100, for example.

The controller 150 can also include one or more physical layer network communications interfaces for data communications with the robots 101 and 102, for example, among other robots and systems. The network communications interfaces can include cellular, WI-FI®, BLUETOOTH®, Z-WAVE®, ZigBee, or other wireless data communications interfaces. The controller 150 can communicate directly with the robots 101 and 102, among other devices not shown in FIG. 1, through mesh or ad-hoc networks using any suitable protocols. The controller 150 can also communicate data over the Internet, for example, using cellular communications and internet protocols. The controller 150 can store data from the sensors, process the data, analyze the data, and trigger reports, notifications, or alert conditions under certain circumstances. The controller 150 can communicate data, notifications, and other information at different times and intervals, using different protocols and syntaxes, and for different reasons and circumstances.

Figure 4:
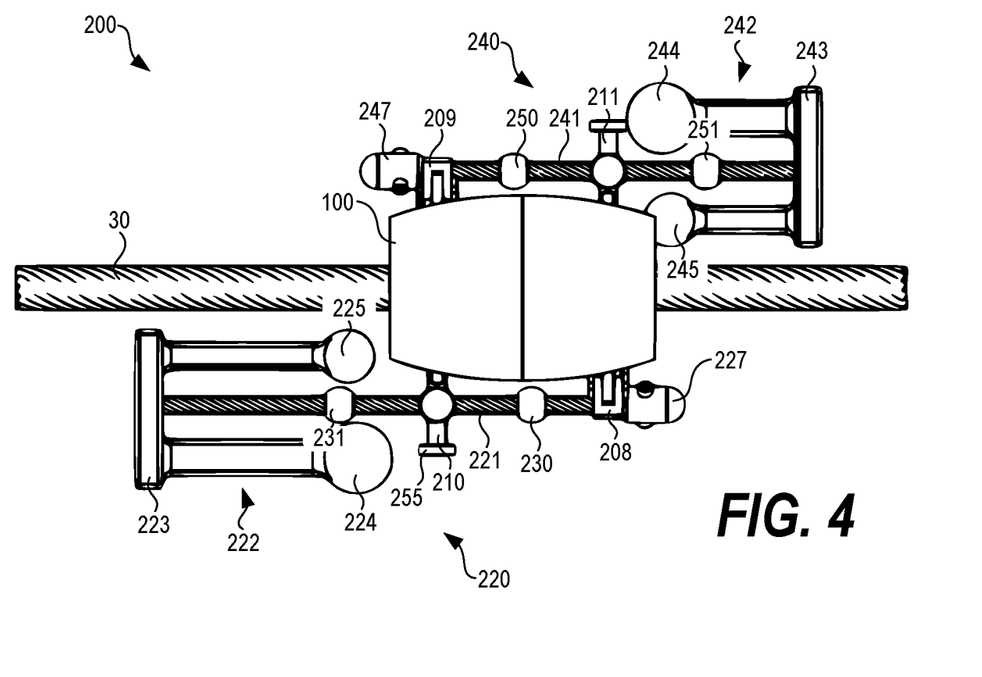
FIG. 4 is a top-down view of the example vibration control robot shown in FIG. 3 according to various embodiments described herein.
Figure 5:
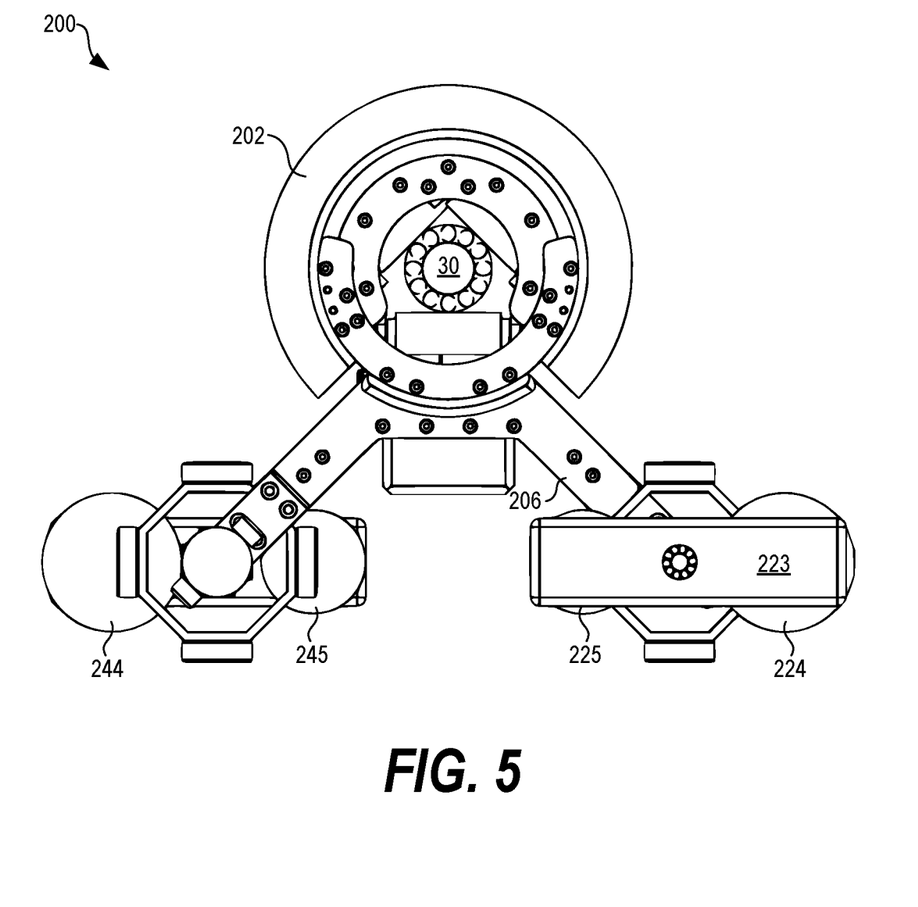
FIG. 5 is an end view of the example vibration control robot shown in FIG. 3 according to various embodiments described herein.

Turning to a more particular example, FIG. 3 is a perspective view of an example vibration control robot 200 according to various embodiments described herein. FIG. 4 is a top-down view of the robot 200 shown in FIG. 3, and FIG. 5 is an end view of the robot 200 shown in FIG. 3. The robot 200 is provided as a representative example, and other vibration control robots consistent with the concepts described herein are within the scope of the embodiments. Among other components, the robot 200 includes a frame, an absorption system, a drive system, a power system, and a controller. Each of those components and related assemblies is described in further detail below.

The robot 200 is installed on the cable 30, as shown in FIGS. 3-5. The robot 200 can be installed on the cable 30 by rolling the frame of the robot 200 open, as described with reference to FIG. 6. Then, the frame of the robot 200 can be closed to surround the cable 30. Referring among FIGS. 3-5, the frame of the robot 200 includes a frame cover 202, a frame roller cage (see FIG. 6 and related description), a frame platform (see FIG. 10 and related description), and frame sidearms 204 and 206. As shown, the sidearm 204 includes a cable binder 208 at one end, and the sidearm 206 includes a harvesting eyelet 210 at one end. The sidearm 204 also includes a harvesting eyelet 211 at an opposite end, and the sidearm 206 also includes another cable binder 209 at an opposite end, although those components are not individually referenced. The frame of the robot 200 can be formed from metal, such as aluminum, steel, or another metal or metal alloy, plastic, rubber, or another suitable material or combination thereof. The components or sections of the frame can be secured together using screws, bolts, mechanical interferences and interlocking features, adhesives, and other means. Other aspects and features of the frame are described in greater detail below.

The absorption system includes a first (or right) side absorption assembly 220 and a second (or left) side absorption assembly 240. The first absorption assembly 220 includes a messenger cable segment 221, an absorbing counterweight tip mass 222 secured at one end of the cable segment 221, and a cable cover 227 secured at another end of the cable segment 221. The cable segment 221 is secured to the frame of the robot 200 at one end of the frame sidearm 204 using the cable binder 208, as best shown in FIG. 3. From the cable binder 208, the cable segment 221 extends laterally, in the general direction of the cable 30, through the harvesting eyelet 210 and can flex along its length.

The absorbing counterweight tip mass 222 includes a counterweight boot 223 secured at the far, unsecured end of the cable segment 221, and provides a dampening mass at the end of the cable segment 221. The counterweight tip mass 222 also includes a first barbell weight 224 and a second barbell weight 225, each of which extends from the counterweight boot 223 back toward the harvesting eyelet 210. The sizes and weights of the first barbell weight 224 and the second barbell weight 225 are different than each other and can vary among the embodiments. The counterweight tip mass 222 can be formed from metal, plastic, a combination thereof, or other materials.

The overall weight of the counterweight tip mass 222 can range among the embodiments, such as between 1 pound to 10 pounds, although other weights can be relied upon. The weight of the counterweight boot 223 can range from between 1 pound to 5 pounds, the weight of the first barbell weight 224 can range from between 1 pound to 5 pound s, and the weight of the second barbell weight 224 can range from between 1 pound to 5 pound s, as examples.

The first absorption assembly 220 also includes a first sliding weight 230 and a second sliding weight 231. The sliding weights 230 and 231 can slide along respective portions of the cable segment 221. The weight of the first sliding weight 230 can be the same as the second sliding weight 231 in one example, such as both between 0.1 pound and 1 pound. The weights of the first sliding weight 230 can be different than the second sliding weight 231 in another example. The sliding weights 230 and 231 can further dampen vibrations admitted from the frame of the robot 200 onto the first absorption assembly 220.

A permanent magnet 233 is fixedly secured along the cable segment 221 at a position within the harvesting eyelet 210. A number of transducer coils, including the transducer coil 255, are positioned around the harvesting eyelet 210 as shown in FIG. 3. The permanent magnet 233 and transducer coil 255 are parts of an electromagnetic transducer for the robot 200, which are described in further detail below.

The second absorption assembly 240 includes a messenger cable segment 241, an absorbing counterweight tip mass 242 secured at one end of the cable segment 241, and a cable cover 247 secured at another end of the cable segment 241. The cable segment 241 is secured to the frame of the robot 200 at one end of the frame sidearm 206 using the cable binder 209, as best shown in FIG. 4. From the cable binder 209, the cable segment 241 extends laterally, in the general direction of the cable 30, through the harvesting eyelet 211 and can flex along its length.

The absorbing counterweight tip mass 242 includes a counterweight boot 243 secured at the far, unsecured end of the cable segment 241, and provides a dampening mass at the end of the cable segment 241. The counterweight tip mass 242 also includes a first barbell weight 244 and a second barbell weight 245, each of which extends from the counterweight boot 243 back toward the harvesting eyelet 211. The sizes and weights of the first barbell weight 244 and the second barbell weight 245 are different than each other and can vary among the embodiments. The counterweight tip mass 242 can be formed from metal, plastic, a combination thereof, or other materials.

The overall weight of the counterweight tip mass 242 can range among the embodiments, such as between 1 pound to 10 pound s, although other weights can be relied upon. The weight of the counterweight boot 243 can range from between 1 pound to 5 pound s, the weight of the first barbell weight 244 can range from between 1 pound to 5 pound s, and the weight of the second barbell weight 245 can range from between 1 pound to 5 pounds, as examples.

The second absorption assembly 240 also includes a first sliding weight 250 and a second sliding weight 251. The sliding weights 240 and 241 can slide along respective portions of the cable segment 241. The weight of the first sliding weight 250 can be the same as the second sliding weight 251 in one example, such as both between 0.1 pound and 1 pound. The weights of the first sliding weight 250 can be different than the second sliding weight 251 in another example. The sliding weights 250 and 251 can further dampen vibrations admitted from the frame of the robot 200 onto the second absorption assembly 240.

A permanent magnet (obscured, not shown) is fixedly secured along the cable segment 241 at a position within the harvesting eyelet 211. A number of transducer coils are positioned around the harvesting eyelet 211 as shown in FIG. 4. The permanent magnet and transducer coils are parts of an electromagnetic transducer for the robot 200, which are described in further detail below.

In one example, a length of the cable segment 221 is greater than a length of the cable segment 241, as shown in FIG. 4, although the cable segments 221 and 241 can be the same length in other cases. In another aspect, the extension (i.e., in length) of the barbell weight 224 and the barbell weight 225 from the counterweight boot 223 can be greater, respectively, than the extension of the barbell weight 244 and the barbell weight 245 from the counterweight boot 243. The first absorption assembly 220 can vary in other ways as compared to the second absorption assembly 240. As examples, the weight of the counterweight tip mass 222 can be different than the weight of the counterweight tip mass 242, the weights of the sliding weights 230 and 231 can vary as compared to the weights of the sliding weights 250 and 251, and other differences can exist.

Figure 6:
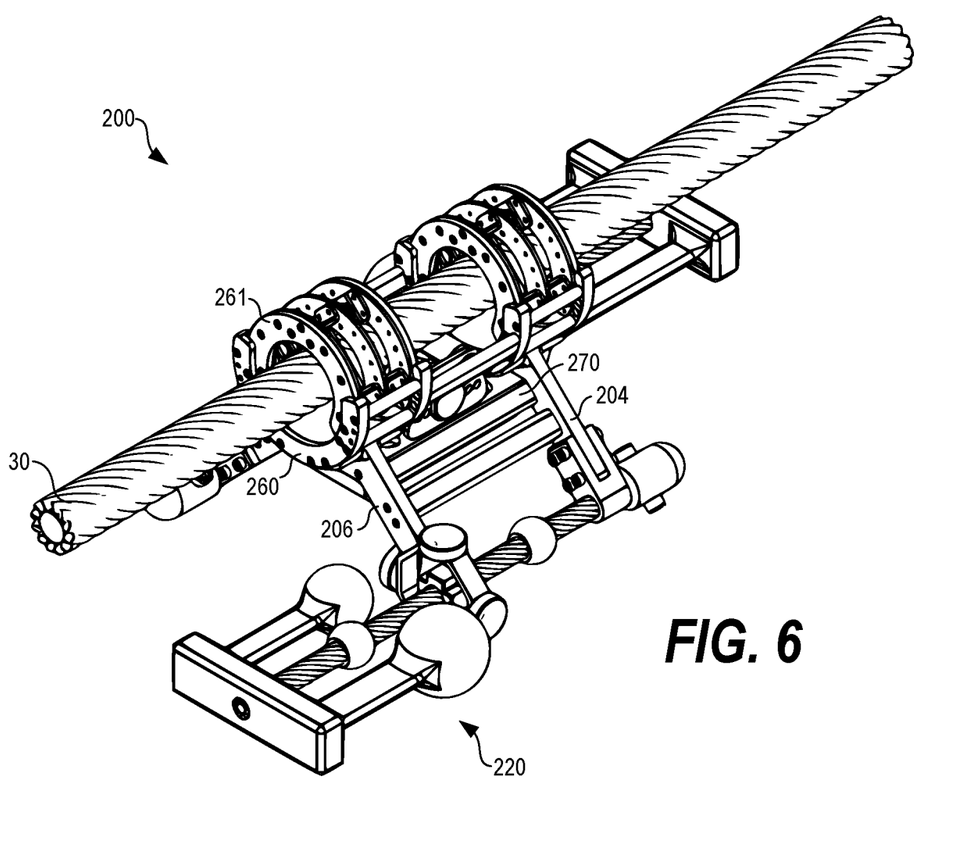
FIG. 6 is a perspective view of the example vibration control robot shown in FIG. 3, with the cover removed, according to various embodiments described herein.

FIG. 6 is a perspective view of the robot 200 shown in FIG. 3, with the frame cover 202 of the robot 200 omitted from view, to show internal features of the frame. As shown in FIG. 6, the frame includes a roller cage. When the robot 200 is installed on the cable 30, the roller cage surrounds the cable 30. The roller cage includes a base roller carriage 260 and a rotatable roller carriage 261. Both the base roller carriage 260 and the rotatable roller carriage 261 can include a number of segments, and two base roller carriage segments and six rotatable roller carriage segments are shown in FIG. 6. A number of passive rollers of the drive system for the robot 200 are mechanically coupled to the rotatable roller carriage 261, using screws, rivets, or other mechanical fasteners. The passive rollers are described below with reference to FIGS. 7 and 8.

In operation, the rotatable roller carriage 261 can be manually rotated or pivoted (e.g., counter-clockwise as shown in FIG. 6) with respect to the base roller carriage 260 (i.e., and slide within and along the base roller carriage 260), to open the frame of the robot 200. The passive rollers also rotate and open at the same time, and the robot 200 can be positioned with respect to the cable 30. Then, the rotatable roller carriage 261 can be manually rotated or pivoted (e.g., clockwise as shown in FIG. 6) with respect to the base roller carriage 260, to close the frame of the robot 200 around the cable 30. Once closed, the passive rollers of the robot 600 can rest upon the cable 30, as further described below with reference to FIGS. 7 and 8.

FIG. 6 also illustrates a frame platform 270, which is mechanically fastened between the frame sidearms 204 and 206. Components for the drive system of the robot 200 are mounted above the frame platform 270. The power system 140 and the controller 150 of the robot 200 are mounted below the frame platform 270.

Figure 7:
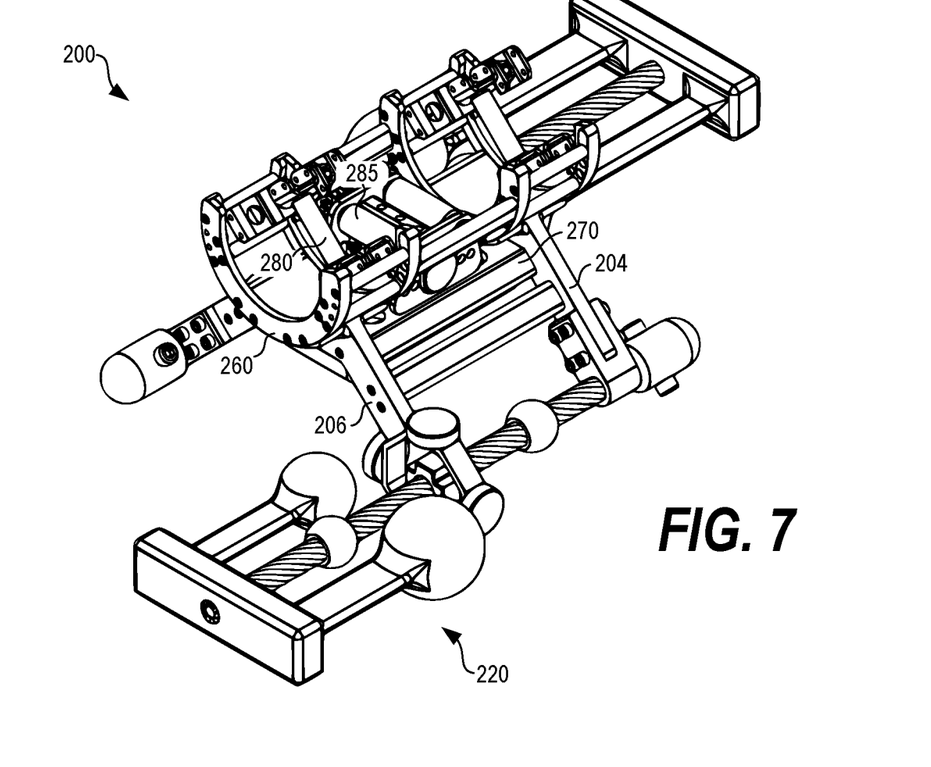
FIG. 7 is a perspective view of the example vibration control robot shown in FIG. 3, with the cover and parts of the frame removed, according to various embodiments described herein.
Figure 8:
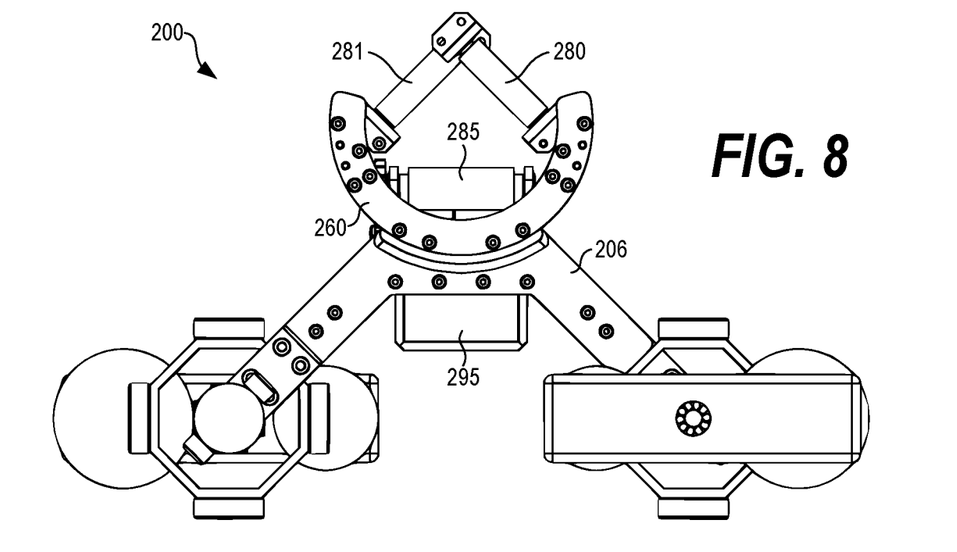
FIG. 8 is an end view of the example vibration control robot shown in FIG. 3, with the cover and parts of the frame removed, according to various embodiments described herein.

FIG. 7 is a perspective view of the robot 200 shown in FIG. 3, with the frame cover 202 and the rotatable roller carriage 261 omitted from view. FIG. 8 is an end view of the robot 200, with the frame cover 202 and the rotatable roller carriage 261 omitted from view. Referring between FIGS. 7 and 8, the passive rollers 280 and 281, among others, of the drive system of the robot 200 are illustrated. The drive roller 285 of the drive system of the robot 200 is also illustrated. The drive roller 285 and other features of the drive system are further described below with reference to FIG. 10. The passive rollers 280 and 281 can rotate freely, with bearings at both ends. The drive roller 285 can be controllably rotated, either clockwise or counter-clockwise, based on drive forces provided by a motor under the control of the controller 150. The passive rollers 280 and 281 and the drive roller 285 can be embodied as hollow or solid shafts, covered or wrapped (or formed) in plastic, rubber, or another surface having a relatively large coefficient of friction.

When the robot 200 is installed over the cable 30, the cable 30 is positioned between the drive roller 285 and the passive rollers 280 and 281, with the weight of the robot 200 carried on the cable 30 based on contact with the passive rollers 280 and 281. The drive roller 285 is pushed up against the cable 30 using pre-loading springs. The pre-loading springs are described below with reference to FIG. 10, and the pre-loading springs press the drive roller 285 against the cable 30, from below, maintaining friction between the drive roller 285 and the cable 30. With the passive rollers 280 and 281 able to rotate freely, any drive rotation provided by the drive roller 285 against the cable 30 will cause the robot 200 to move or slide along the cable 30, to reposition the robot 200 along the cable 30. Additionally, with the cable 30 being in mechanical contact with and secured against the passive rollers 280 and 281 and the drive roller 285, among other rollers of the robot 200, mechanical vibrations are transferred from the cable 30 to the robot 200. The vibrations are ultimately coupled to and dampened by the absorption assembly 220 and the absorption assembly 240.

FIG. 8 also illustrates an enclosure 295 mounted below the frame platform 270. The power system 140 and controller 150 of the robot 200 can be mounted and secured within the enclosure 295.

Figure 9:
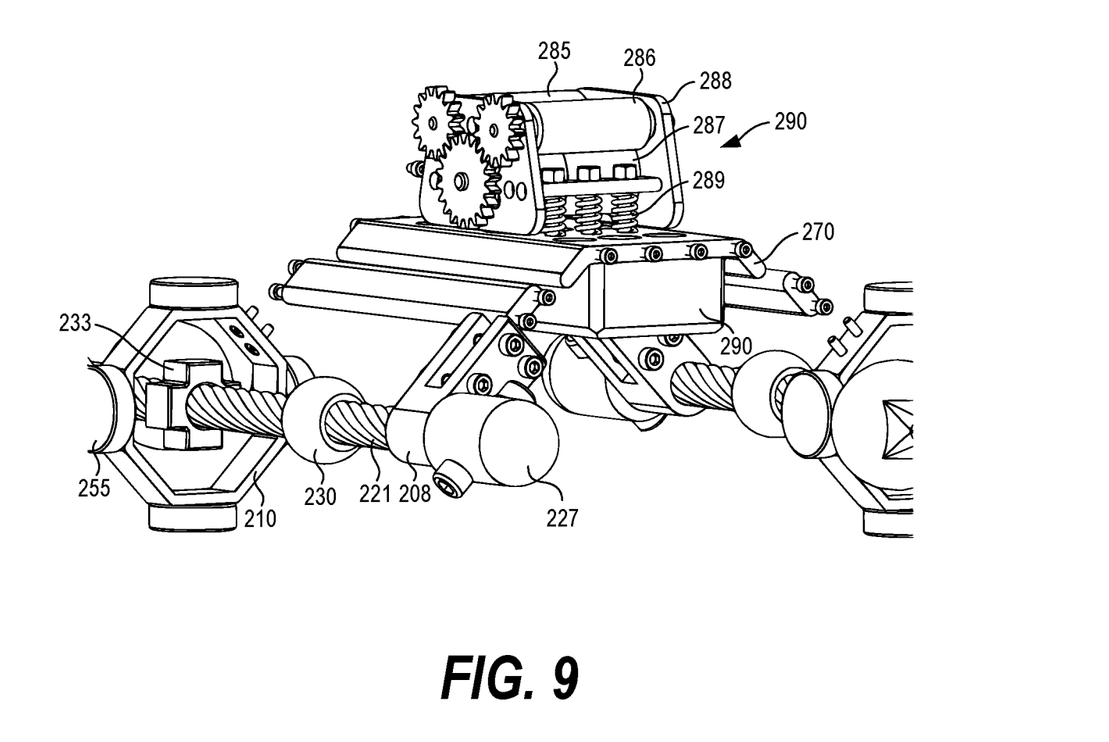
FIG. 9 is a side view of the example vibration control robot shown in FIG. 3, with the cover and parts of the frame removed, according to various embodiments described herein.

FIG. 9 is a side view of the robot 200 shown in FIG. 3, with the frame cover 202, the rotatable roller carriage 261, the frame sidearms 204 and 206, and the passive rollers 280 and 281 omitted from view. As shown, the drive system of the robot 200 includes a motive assembly 290. The motive assembly 290 includes a motor 287, the drive roller 285, and a drive roller 286. The motor 287, the drive roller 285, and the drive roller 286 are secured between a frame 288 of the motive assembly 290. The motor 287 can rotate the drive rollers 285 and 286 through a mechanical coupling using a gear assembly, as shown in FIG. 10, based on control signals (and power) provided from the controller 150. The motive assembly 290 also includes pre-loading springs 289. The pre-loading springs 289 push the motive assembly 290 up, away from and against the frame platform 270, to press the drive rollers 285 and 286 against the cable 30, from below, maintaining friction between the drive rollers 285 and 286 and the cable 30.

The permanent magnet 233 is also shown clearly in FIG. 9. The permanent magnet 233 is fixedly secured along the cable segment 221 at a position within the harvesting eyelet 210. A number of transducer coils, including the transducer coil 255, are positioned around the harvesting eyelet 210 as shown in FIG. 9. The permanent magnet 233 and transducer coil 255 are parts of an electromagnetic transducer for the robot 200. When the cable segment 221 moves and absorbs vibrations from the cable 30, the permanent magnet 233 also moves within the harvesting eyelet 210, providing a moving magnetic field about the transducer coil 255, among other transducer coils mounted around the harvesting eyelet 210. The transducer coils generate an electric potential based on the moving magnetic fields from the permanent magnet 233, and the power system 140 of the robot 200 captures and stores the electric potential in a battery, a capacitor, or some energy storage system. In this way, the power system 140 is configured to harness energy from the vibrations on the cable 30.

Certain components of the robot 200 can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The controller 150 can include at least one processing circuit. Such a processing circuit can include, for example, one or more processors and one or more storage or memory devices coupled to a local interface. The local interface can include, for example, a data bus with an accompanying address/control bus or any other suitable bus structure. The storage or memory devices can store data or components that are executable by the processors of the processing circuit. The controller 150 can be embodied as one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

The disclosure is not limited to the particular embodiments described above. Unless defined otherwise, all technical and scientific terms used herein have the same meaning as commonly understood by one of ordinary skill in the art to which this disclosure belongs. Other methods and materials similar or equivalent to those described herein can also be used in the practice or testing of the present disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The examples are put forth to provide those of ordinary skill in the art with a complete disclosure and description of how to construct and use the systems and methods disclosed and claimed herein. It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Therefore, at least the following is claimed:

1. A vibration control robot, comprising: a frame, the frame comprising a frame roller cage configured to roll open and closed around a cable; a drive system comprising a motor system to maneuver the vibration control robot along the cable; and a vibration absorption system to admit and absorb mechanical vibrations from the cable, the vibration absorption system comprising a messenger cable segment mechanically coupled to the frame of the vibration control robot and a sliding mass that slides along the messenger cable segment.

2. The vibration control robot of claim 1, wherein the vibration absorption system further comprises:
an absorbing counterweight tip mass secured at one end of the messenger cable segment.

3. The vibration control robot of claim 2, wherein the vibration absorption system further comprises a permanent magnet of an electromagnetic transducer, the permanent magnet being fixedly positioned at a location along the messenger cable segment.

4. The vibration control robot of claim 3, wherein:
the vibration absorption system further comprises a second sliding mass;
the sliding mass is positioned on one side of the permanent magnet along the messenger cable segment; and
the second sliding mass is positioned on another side of the permanent magnet along the messenger cable segment.

5. The vibration control robot of claim 3, wherein:
the frame further comprises:
a first side arm comprising a cable binder at one end of the first side arm; and
a second side arm comprising a harvesting eyelet at one end of the second side arm;
the electromagnetic transducer further comprises a transducer coil positioned around the harvesting eyelet; and
the permanent magnet is positioned at a location along the messenger cable segment within the harvesting eyelet.

6. The vibration control robot of claim 2, wherein the vibration absorption system further comprises: a second messenger cable segment of a second predetermined length, the second messenger cable segment being mechanically coupled to the frame of the vibration control robot, to admit mechanical vibrations from the cable onto the messenger cable segment; a second absorbing counterweight tip mass secured at one end of the second messenger cable segment; and a second sliding mass.

7. The vibration control robot of claim 1, wherein the drive system further comprises: at least one passive roller to rest upon the cable and support the vibration control robot on the cable; and pre-loading springs to push the motor system against the cable and clamp the cable between the motor system and the passive roller.

8. The vibration control robot of claim 1, further comprising a power system comprising at least one battery and power regulation module.

9. The vibration control robot of claim 1, further comprising a communications module for wireless command and control communications.

10. The vibration control robot of claim 1, further comprising a control system configured to reposition the vibration control robot along the cable to increase vibration suppression and energy harvesting.

11. The vibration control robot of claim 1, further comprising a control system configured to reposition the vibration control robot at an antinode of the cable.

12. A method for a vibration control robot, comprising: sensing movement of a cable by the vibration control robot; and positioning the vibration control robot along a cable to increase suppression of the movement and energy harvesting by the vibration control robot, wherein the vibration control robot comprises: a frame, the frame comprising a frame roller cage configured to roll open and closed around the cable; a drive system comprising a motor system to maneuver the vibration control robot along the cable; and a vibration absorption system to admit and absorb mechanical vibrations from the cable.

13. The method of claim 12, further comprising repositioning the vibration control robot, over time, to an antinode of the cable.

14. The method of claim 12, wherein the vibration absorption system comprises: a messenger cable segment of a predetermined length, the messenger cable segment being mechanically coupled to the frame of the vibration control robot, to admit mechanical vibrations from the cable onto the messenger cable segment; an absorbing counterweight tip mass secured at one end of the messenger cable segment; and a sliding mass.

15. The method of claim 14, wherein the vibration absorption system further comprises a permanent magnet of an electromagnetic transducer, the permanent magnet being fixedly positioned at a location along the messenger cable segment.

16. A suspended cable system, comprising:
a frame, the frame comprising a frame roller cage configured to roll open and closed around a cable;
a drive system comprising a motor system to maneuver the suspended cable system along the cable; and
a vibration absorption system to admit and absorb mechanical vibrations from the cable, the vibration absorption comprising:
a messenger cable segment of a predetermined length, the messenger cable segment being mechanically coupled to the frame, to admit mechanical vibrations from the cable onto the messenger cable segment;
an absorbing counterweight tip mass secured at one end of the messenger cable segment; and
a sliding mass that slides along the messenger cable segment.

17. The suspended cable system of claim 16, wherein the vibration absorption system further comprises a permanent magnet of an electromagnetic transducer, the permanent magnet being fixedly positioned at a location along the messenger cable segment.

18. The suspended cable system of claim 17, wherein:
the frame further comprises:
a first side arm comprising a cable binder at one end of the first side arm; and
a second side arm comprising a harvesting eyelet at one end of the second side arm;
the electromagnetic transducer further comprises a transducer coil positioned around the harvesting eyelet; and
the permanent magnet is positioned at a location along the messenger cable segment within the harvesting eyelet.

19. The suspended cable system of claim 16, wherein the vibration absorption system further comprises:
a second messenger cable segment of a second predetermined length, the second messenger cable segment being mechanically coupled to the frame, to admit mechanical vibrations from the cable onto the messenger cable segment; and
a second absorbing counterweight tip mass secured at one end of the second messenger cable.

20. The suspended cable system of claim 16, wherein the drive system further comprises:
at least one passive roller to rest upon the cable and support the suspended cable system on the cable; and pre-loading springs to push the motor system against the cable and clamp the cable between the motor system and the passive roller.

* * * * *